June 23, 1953  V. L. BARR  2,643,162
ANTIFRICTION CARRIAGE ROLLER
Filed Aug. 1, 1950  2 Sheets-Sheet 1
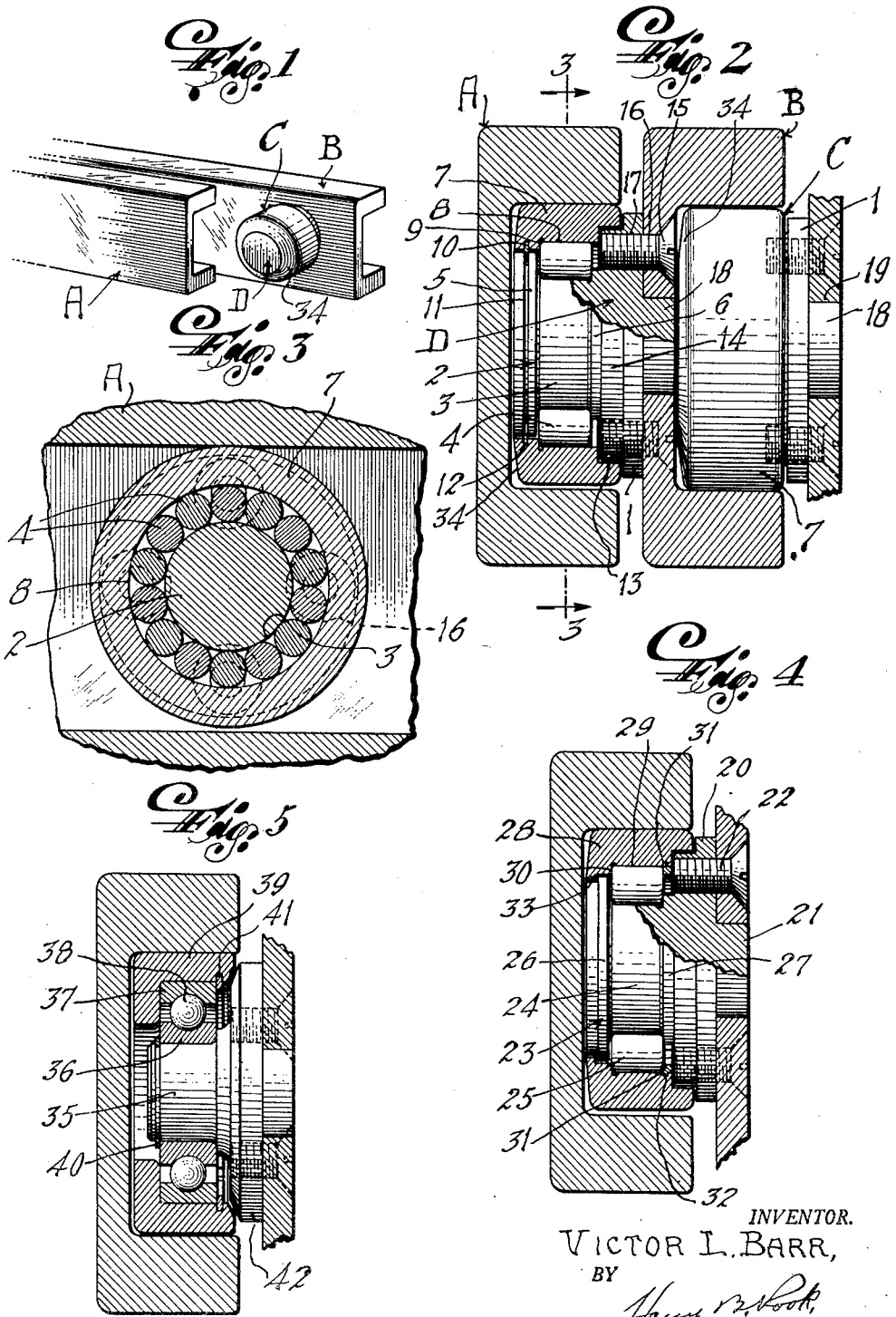
INVENTOR.
VICTOR L. BARR,
BY
ATTORNEY

INVENTOR.
VICTOR L. BARR,
BY
ATTORNEY

Patented June 23, 1953

2,643,162

UNITED STATES PATENT OFFICE 2,643,162

ANTIFRICTION CARRIAGE ROLLER

Victor L. Barr, Philadelphia, Pa., assignor to Roller Bearing Company of America, Trenton, N. J., a corporation of New Jersey Application August 1, 1950, Serial No. 176,958

6 Claims. (Cl. 308—6)

This invention relates to an antifriction carriage roller, of the type that is used for rollably mounting one part or element on another, for example rollers that are used for mounting elevating platforms on the main frames of lift trucks.

Carriage rollers of this general character must operate in limited spaces, generally are fastened by screws to one of the relatively rollable elements, must withstand severe stresses and strains and also provide adequate anti-friction load capacity and should be inexpensive; and the heretofore known carriage rollers have failed to fulfill one or more of these requirements. Therefore, a prime object of the invention is to provide such a roller which shall embody novel and improved features of construction whereby the roller shall possess a maximum of strength and antifriction load capacity within minimum over-all dimensions and at low cost.

Another object is to provide such a carriage roller which shall be simple in construction, easy to assemble and can be securely fastened on a rollable element.

Many heavy duty elevating trucks or car loaders include an elevating platform or load supporting carriage including forks having rollers rollably mounted in vertical channel bars, said rollers and the flanges of the channel bars assuming the fore and aft strains incident to the load on the load supporting carriage, and side rollers, shoes or buttons are mounted on the load supporting carriage to reduce the friction between the carriage and the bases of the vertical channels incident to sidewise or lateral movement of the carriage. These side rollers or shoes do not provide the desired lateral stability of the carriage and the loads assumed by each side roller or shoe are excessively high, particularly because said rollers or shoes are too closely spaced on the carriage between the main rollers.

Therefore, a further object of the invention is to provide a combination of the carriage roller of the general character described and a guide channel so constructed as to also perform the functions of said side rollers or shoes and at the same time insure greater carriage stability and a minimum of load per roller.

Other objects, advantages and results of the invention will be brought out by the following description in conjunction with the accompanying drawings in which Figure 1 is a fragmentary perspective view of portions of two relatively rollable elements and a carriage roller embodying the invention attached to one of said elements;

Figure 2 is an enlarged transverse vertical sectional view through guide channels forming portions of two relatively rollable elements and illustrating in side elevation one roller embodying the invention and in vertical section another identical roller;

Figure 3 is a vertical sectional view approximately on the plane of the line 3—3 of Figure 2;

Figure 4 is a longitudinal sectional view through another form of carriage roller embodying the invention with portions shown in side elevation;

Figure 5 is a similar view showing one of the heretofore known carriage rollers;

Figure 6:
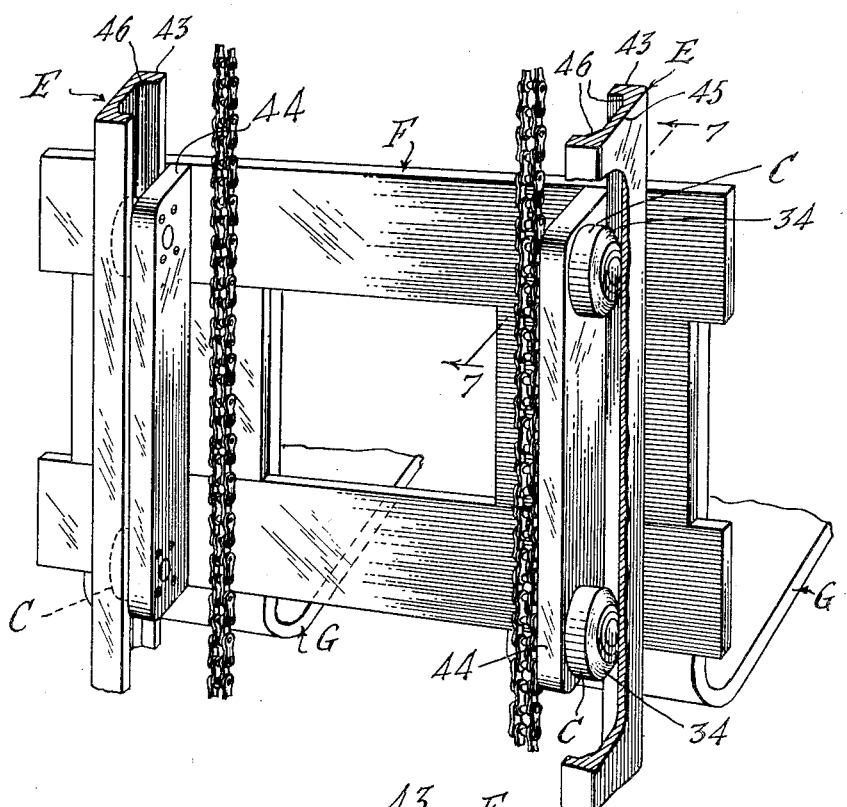
Figure 6 is a fragmentary, schematic, perspective view of a portion of a load supporting carriage and vertical channel guide bars therefor of an elevating truck, embodying the invention.

For the purpose of illustrating the principles of the invention, I have shown it in conjunction with two channel bars A and B each of which forms a part of one of two relatively rollable elements. As shown, the carriage roller C of the invention is secured to the outer side of the base portion of one of the channel bars so as to run in the channel of the other channel bar that serves as a track for the roller.

In the form of the invention shown in Figure 2, the carriage roller includes a body portion D having a base flange 1 from one side of which projects a bearing stud 2 having a cylindrical bearing surface or race way 3 for rollers 4, there being annular or circumferential shoulders or flanges 5 and 6 at opposite ends of the bearing surface which are abutted by the ends of the rollers for guiding the rollers in their movement around the stud. A tread ring or tire 7 having an interior cylindrical bearing surface or race ring 8 is rollably related to the rollers 4 and having a shoulder 9 at the outer end thereof to be abutted by the corresponding ends of the rollers, said shoulder being approximately in the same plane perpendicular to the axis of the race way. The tread ring 7 is held against longitudinal movement in one direction on the stud 2 by a split spring ring 10 that is seated in grooves 11 and 12 in the flange 5 and the tread ring, respectively, the tread ring being held against longitudinal movement relatively to the stud in the opposite direction by engagement of the shoulder 9 with the ends of the rollers which also abut the shoulder 6 on the bearing stud. The split ring 10 is inserted by first springing it into the groove 11 and then compressing it into the groove into a position substantially flush with the peripheral surface of the flange 5, after which the tread ring 7 is slipped over said flange onto the split ring whereupon the split ring will snap outwardly into the groove 12. The opposite or inner end of the tread ring has an annular rabbet 13 into which projects a reduced portion 14 of the base flange 1 of the body portion.

The body portion is secured to the corresponding channel or rollable element by screws 15 that extend through openings 16 in the channel and are screw threaded into openings 17 in the base flange 1; and preferably a boss 18 is provided centrally of the side of said flange opposite the bearing stud to seat in an opening 19 in the channel bar.

A modification of the invention is shown in Figure 4 where the body portion of the roller has a base flange 20 identical with the flange 1, a boss 21 like the boss 18, and is secured to the channel bar by screws 22 in the same manner in which the base flange 1 is secured through the channel bar. The bearing stud 23 has a cylindrical bearing surface or race way 24 for rollers 25, and circumferential flanges or shoulders 26 and 27 for guiding the rollers are provided at opposite ends of the race way.

The tread ring or tire 28 has an inner cylindrical race way 29 rollably related to the rollers 25 and also has an annular shoulder 30 to abut the rollers in one end thereof. The tread ring is secured on the body portion by a split ring 31 that is seated in an annular groove 32 at the end of the race way 29 opposite the shoulder 30, said snap ring 31 also serving as an abutment guide for the ends of the rollers. It will be observed that the snap ring 31 can be inserted only by manipulation thereof through the holes in the base flange 20 for the screws 22. Preferably the opposite end of the tread ring has an inwardly extending annular flange 33 to overlie the outer surface of the flange 26 on the bearing stud.

In both forms of the invention, the outer faces of the tread rings 7 and 28 are beveled as indicated at 34 to permit relative twisting of the channel bars A and B without possibility of the outer edges of the tread rings digging into the corners of the channel bars. As shown, the tread rings have cylindrical surfaces on their outer peripheries and the beveled surfaces 34 are on the ends of the tread rings opposite the respective body portions and extend outwardly from the tread surfaces to the inner peripheries of the tread rings.

In both forms of the invention, it will be observed that the relationship of the shoulders and flanges of the tread ring and bearing stud provide in effect a labyrinth seal to exclude dirt from the race ways and rollers and retain lubricant therein. A maximum number of rollers and race ways of maximum area are provided in minimum over-all dimensions and the large bearing stud and its relationship to the base flange 1 assures a maximum of strength and resistance to bending stresses on the stud incident to operation of the carriage roller. Also a maximum of length for the holes of screws 16 and 22 is provided by the relatively thick base flange that extends into the annular rabbet 13 in the tread ring. The carriage roller constructed in accordance with the invention therefore provides a maximum of strength and antifriction load capacity within minimum over-all dimensions and at minimum cost.

Figure 7:
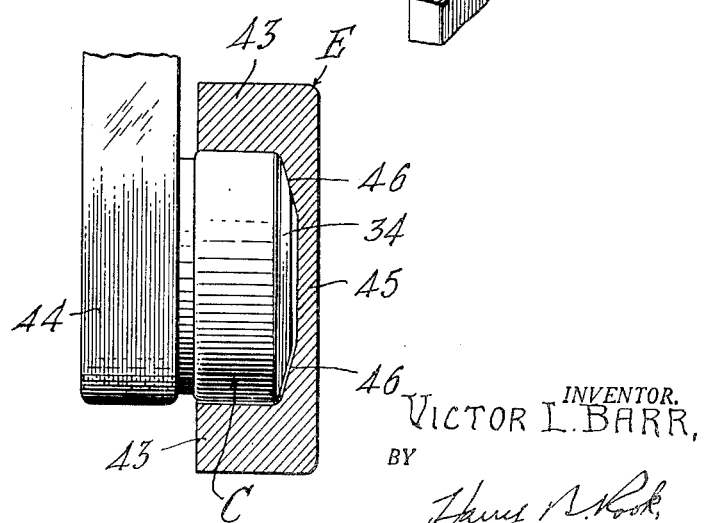
Figure 7 is an enlarged horizontal sectional view approximately on the plane of the line 7—7 of Figure 6.

Figures 6 and 7 of the drawings illustrate a combination of a vertical guide channel and a carriage roller, constructed in accordance with the invention and more particularly designed for elevating trucks. As shown, the structure comprises two vertical channel bars E which have rollably mounted between their flanges 43 carriage rollers C above described mounted on vertical side pieces 44 of a load supporting carriage F which may be of any suitable construction but is shown as of the fork type including spaced load-carrying arms G. It will be observed that the rollers C bearing against the flanges 43 of the channels E, assume the fore and aft strains incident to loads on the carriage F, each upper roller engaging one flange of the corresponding channel as best shown in Figure 7, while the lower rollers engage the opposite flanges of the channels.

At the zones of juncture of the flanges 43 and the bases 45 of the channel E, are provided diagonal or inclined surfaces 46 to be abuttingly contacted by the beveled outer faces 34 of the carriage rollers upon lateral or sidewise movement of the load supporting carriage F, as best shown in Figure 7. These beveled surfaces 46 on the channels and 34 on the rollers thus cooperate and perform substantially the same function as the additional end rollers or shoes that have been used heretofore, but the rollers C of the invention provide greater lateral stability of the carriage F and assume a smaller load per roller than do the known types of end rollers or shoes.

In order that the advantages of the invention may be more fully appreciated, in Figure 5 has been illustrated a known type of carriage roller upon which the invention is an improvement. It will be observed that the bearing stud 35 of the base portion is relatively small in diameter and that a ball bearing including inner and outer races 36 and 37 respectively, with balls 38 between them, are interposed between the stud 35 and the tire 39. Moreover, two snap rings 40 and 41 are required for holding the tire on the body portion and the base flange 42 provides screw holes of insufficient length to permit a secure fastening of the body portion to the rollable element or channel.

I claim:

1. A carriage roller comprising a body portion having a base flange provided with openings for fastening elements to secure said body portion on another element, a bearing stud projecting from said base flange centrally thereof and having cylindrical roller raceway, a tread ring rotatable on said bearing stud and having a roller raceway in coaxial spaced relation to said raceway on the bearing stud, and rollers interposed between said raceways, there being a circumferential shoulder at each end of said raceway on the bearing stud to hold said rollers against longitudinal movement and there being an annular shoulder at the end of the raceway on said tread ring opposite said base flange to abut the juxtaposed ends of said rollers for limiting movement of said tread ring longitudinally in one direction, and means for limiting longitudinal movement of said tread ring in the other direction.

2. A carriage roller as defined in claim 1 wherein the last-named means comprises a groove in said bearing stud opposite a groove in said tread ring, and an element having a portion seated in each of said grooves.

3. A carriage roller as defined in claim 1 wherein the last-named means comprises a groove in said bearing stud opposite a groove in said tread ring, and a split ring seated in said grooves.

4. A carriage roller as defined in claim 1 wherein the last-named means comprises a groove in said tread ring at the end of said raceway opposite said shoulder on the tread ring, and a ring seated in said groove and abutting the adjacent ends of said rollers.

5. A carriage roller as defined in claim 1 wherein said tread ring has an annular rabbet in the end thereof opposite said shoulder, and said base flange has a portion extending into said rabbet whereby the length of the tread surface of said tread ring and the thickness of said base flange are increased to an amount equal to the depth of said rabbet.

6. In a combination, a carriage having two rollers spaced apart on each of two opposite sides thereof, each roller including a body portion fastened on said carriage and having a bearing stud, a tread ring rotatable on and coaxially with said bearing stud and having a cylindrical tread surface on its outer periphery, said tread ring also having a beveled surface on its end opposite said body portion and extending outwardly from the tread surface to the inner periphery of the tread ring, and a pair of guide channel bars having their channels facing each other and each having a base portion and two spaced flanges projecting therefrom, each channel having the rollers at one side of said carriage rollable therein with said cylindrical tread surfaces in load carrying contact with said flanges so that radial loads on the rollers are transmitted directly to said flanges only, said base portions of said channels at the zones of juncture of said flanges with the base portions having inclined surfaces corresponding to and to be abuttingly and rollably contacted by said beveled surfaces on the roller tread rings upon sidewise movement of said carriage thereby to assume endwise thrust loads on the rollers.

VICTOR L. BARR.

References Cited in the file of this patent

UNITED STATES PATENTS

| Number | Name | Date |
|---|---|---|
| 1,571,334 | Howard | Feb. 2, 1926 |
| 1,759,083 | Barton | May 20, 1930 |
| 1,782,622 | Kilian | Nov. 25, 1930 |
| 1,794,836 | DeWalt | Mar. 3, 1931 |
| 1,923,853 | VanDuyn | Aug. 22, 1933 |
| 2,480,066 | Weaver | Aug. 23, 1949 |

FOREIGN PATENTS

| Number | Country | Date |
|---|---|---|
| 499,100 | Germany | May 30, 1930 |